(12) United States Patent
Lake

(10) Patent No.: US 11,248,718 B2
(45) Date of Patent: Feb. 15, 2022

(54) MAGNETIC ACTUATOR, SYSTEM AND METHOD

(71) Applicant: Gary Lake, Cypress, TX (US)

(72) Inventor: Gary Lake, Cypress, TX (US)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 136 days.

(21) Appl. No.: 16/694,559

(22) Filed: Nov. 25, 2019

(65) Prior Publication Data

US 2021/0156490 A1 May 27, 2021

(51) Int. Cl.
*F16K 31/08* (2006.01)
*E21B 34/06* (2006.01)

(52) U.S. Cl.
CPC ............ *F16K 31/08* (2013.01); *E21B 34/066* (2013.01)

(58) Field of Classification Search
CPC .... F16K 31/08; F16K 31/086; F16K 31/1225; E21B 34/066
See application file for complete search history.

(56) References Cited

U.S. PATENT DOCUMENTS

| | | | | |
|---|---|---|---|---|
| 2,533,491 A * | 12/1950 | McMahon | ............ | F16K 31/086 251/65 |
| 3,212,751 A * | 10/1965 | Hassa | ............ | F16K 31/086 251/65 |
| 3,633,612 A * | 1/1972 | Gross | ............ | F16K 17/22 137/498 |
| 4,671,486 A * | 6/1987 | Giannini | ............ | F16K 31/088 251/267 |
| 4,940,207 A * | 7/1990 | Katsuyama | ............ | F16K 31/086 251/65 |
| 7,316,270 B2 * | 1/2008 | Shen | ............ | E21B 43/128 166/105 |
| 8,267,167 B2 | 9/2012 | Lake et al. | | |
| 8,919,730 B2 * | 12/2014 | Vick, Jr. | ............ | E21B 34/10 251/65 |
| 10,982,506 B2 * | 4/2021 | Eriksen | ............ | F16H 25/20 |
| 2007/0289734 A1 * | 12/2007 | McDonald | ............ | E21B 34/06 166/66.5 |
| 2008/0211323 A1 * | 9/2008 | Graffin | ............ | F16K 31/086 310/12.25 |
| 2013/0200282 A1 * | 8/2013 | Quan | ............ | A62C 35/68 251/65 |

* cited by examiner

*Primary Examiner* — Umashankar Venkatesan
(74) *Attorney, Agent, or Firm* — Cantor Colburn LLP

(57) ABSTRACT

A magnetic actuator including a housing having an inside surface, an outside surface and a body between the inside and outside surfaces; a mobile component movable relative to the housing; a magnet piston chamber disposed within the body; a magnet piston disposed in the magnet piston chamber and disposed to effect movement of the mobile component relative to the housing, the magnet piston having a magnetic field; a prime piston chamber disposed within the body in spaced relationship to the magnet piston chamber and segregated from the magnet piston chamber by material of the body, there being no fluid path between the magnet piston chamber and the prime piston chamber; a prime piston disposed in the prime piston chamber, the prime piston having a magnetic field; wherein the magnet piston is responsive to movement of the prime piston by magnetic interaction between the magnet piston and the prime piston.

20 Claims, 3 Drawing Sheets

MAGNETIC ACTUATOR, SYSTEM AND METHOD

BACKGROUND

Actuators are ubiquitous in their nature and employment. In some cases, the construction of actuators must take into account potential for fluid leaks that could be undesirable. Seal technology is therefore important to actuation and has been advanced for years. Nevertheless, even with advanced sealing options, leaks can occur. Therefore, there is interest in actuators for fluid systems that do not include a leak path at all such that seals are not an issue. Some efforts have been made to use magnets to actuate various components without a physical connection between the prime mover and the component to be moved. Some of these have been successful but often suffer from increased girth. The art would well receive actuators that reduce the common added girth and yet maintain the benefits of a leak pathless construction.

SUMMARY

Disclosed is a magnetic actuator including a housing having an inside surface, an outside surface and a body between the inside and outside surfaces; a mobile component movable relative to the housing; a magnet piston chamber disposed within the body; a magnet piston disposed in the magnet piston chamber and disposed to effect movement of the mobile component relative to the housing, the magnet piston having a magnetic field; a prime piston chamber disposed within the body in spaced relationship to the magnet piston chamber and segregated from the magnet piston chamber by material of the body, there being no fluid path between the magnet piston chamber and the prime piston chamber; a prime piston disposed in the prime piston chamber, the prime piston having a magnetic field; wherein the magnet piston is responsive to movement of the prime piston by magnetic interaction between the magnet piston and the prime piston.

BRIEF DESCRIPTION OF THE DRAWINGS

The following descriptions should not be considered limiting in any way. With reference to the accompanying drawings, like elements are numbered alike:

FIG. 3 is a similar view as FIG. 1 but with optional components; and.

DETAILED DESCRIPTION

A detailed description of one or more embodiments of the disclosed apparatus and method are presented herein by way of exemplification and not limitation with reference to the Figures.

Figure 1:
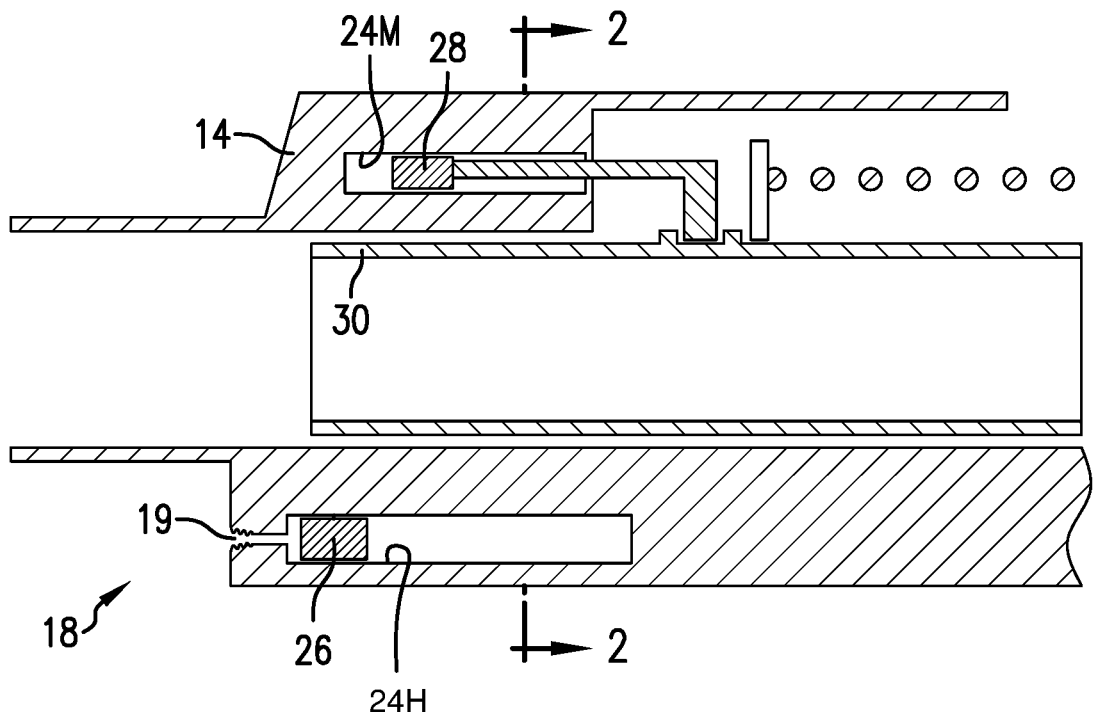
FIG. 1 is a schematic longitudinal cross section of a tool illustrating the magnetic actuator as disclosed herein.
Figure 2:
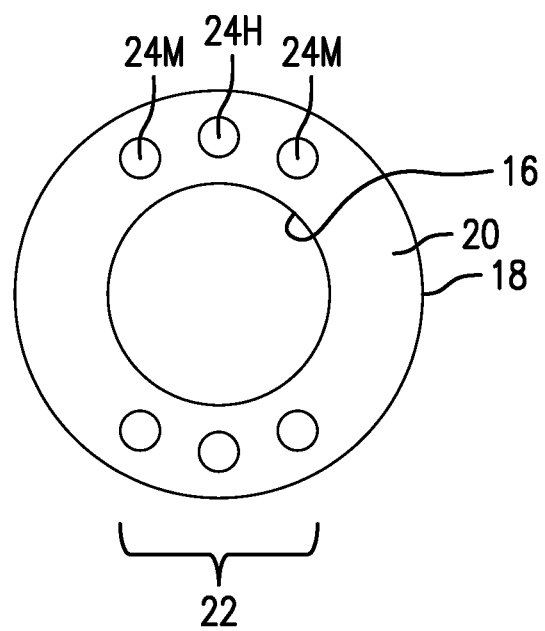
FIG. 2 is a cross section of FIG. 1 taken along section line 2-2.

An embodiment of a magnetic actuator 10 as disclosed herein is illustrated as a part of a subsurface safety valve (SSV) for a resource recovery or carbon dioxide sequestration system. It will be appreciated that the magnetic actuator 10 can also be configured with other tools requiring actuation while achieving the same function and size benefits as it does in conjunction with FIGS. 1 and 2 hereof.

Magnetic actuator 10, as noted is illustrated disposed within an SSV 12 simply for example. The SSV 12 includes a housing 14 having a radially inside surface 16 and a radially outside surface 18 bounding a body 20. Disposed within the body 20 are actuation subassemblies 22. It is to be appreciated that two subassemblies are illustrated but more may be employed providing there is sufficient space to fit them in body 20. For example, at least two more subassemblies 22 would fit in body 20 as illustrated. It is also to be appreciated that while each subassembly is illustrated with three bores 24 denoted as 24M for magnet piston chambers and 24H for hydraulic or prime piston chambers it is also contemplated that more or fewer magnet piston chambers 24M be used with a hydraulic piston chamber 24H. Specifically, there may be a single hydraulic piston chamber 24H and a single magnet piston chamber 24M or there may be a single hydraulic piston chamber 24H with multiple magnet piston chambers 24M disposed roughly in a ring thereabout such as 3, 4, 5 up to N magnet piston chambers limited only by available space.

Figure 3:
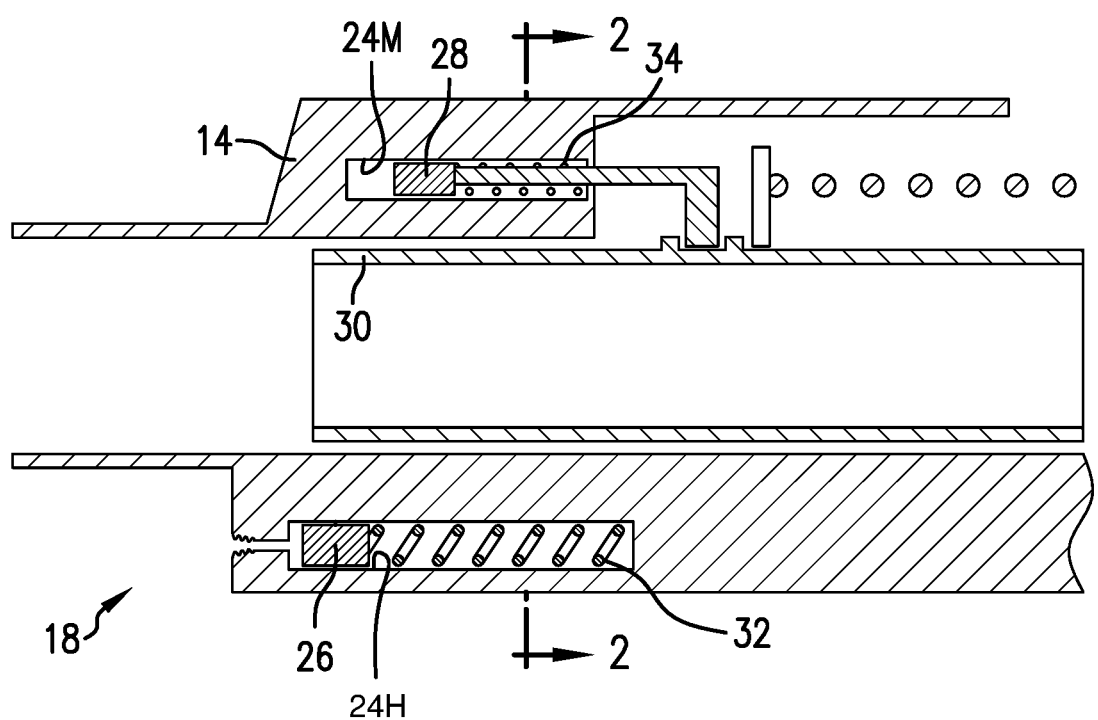
Figure 4:
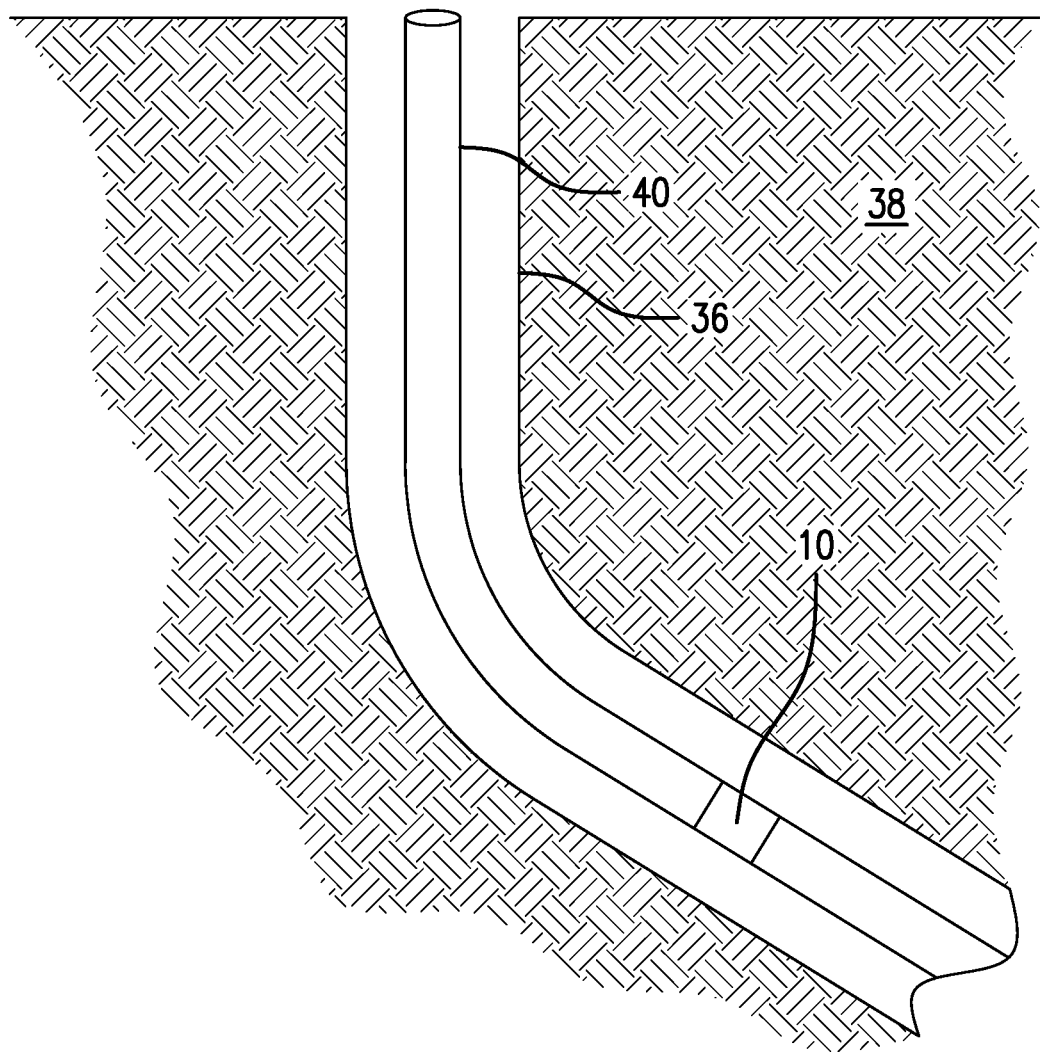
FIG. 4 is a schematic view of a borehole system including the magnetic actuator disclosed herein.

In each of the hydraulic piston chambers 24H is a hydraulic piston 26 and in each of the magnet piston chambers 24M is a magnet piston 28. The hydraulic piston chambers 24H are fluidly connected to a pressure source 19, be that by control line, annulus pressure, etc. so that upon application of fluid pressure, the hydraulic piston 26 may be hydraulically urged to a different position than it held prior to application of differential fluid pressure on it. The hydraulic piston chambers 24H also have a section on a side of the hydraulic piston 26 opposite the fluid pressure source that will allow piston movement into the space upon application of differential pressure. This space houses a compressible fluid that may be held at atmospheric pressure for example (prior to actuation) or simply at a lower pressure than the pressure expected to be applied to the piston 26 from the source during activation so that a differential pressure exists in the correct direction to cause movement of the piston 26. In some embodiments, a biasing member such as a coil spring 32 (see FIG. 3) may also be supplied in this section of the hydraulic piston chamber 24H to help return the hydraulic piston 26 to the unactuated position. Magnet piston chambers 24M are fluidly segregated from the hydraulic piston chambers 24H such that no fluid path exists between them. The magnet pistons 28 extend to connect to a mobile component 30 such as a flow tube as illustrated. Movement of the magnet piston 28, then, causes movement of the mobile component 30. A coil spring 34 or other biasing member may also be disposed to assist the magnet piston in returning to the unactuated position if desired, see FIG. 3.

Each of the pistons 26 and 28 is configured with a magnetic field either through being directly magnetized or being supplied with a permanent magnet thereon. In embodiments, there may be one field or multiple fields on a piston. For example, several magnets may be disposed with the piston. In iterations, the magnets may be closely spaced with one another on the piston (26 or 28) or in other iterations the magnets may be spaced apart from one another on the piston (26 or 28). These differing configurations relate to whether magnetic coupling or magnetic repulsion is to be the dominant motive force between the hydraulic piston 26 or the magnet piston 28. For magnetic coupling configurations, magnets would be closely spaced and for repulsion, they would be further spaced apart. It is magnetic interaction of coupling, repulsion or both that provides the transmission of motive force from the hydraulic piston 26 to the magnet piston 28.

In operation, a hydraulic differential pressure is caused to exist across the hydraulic piston 26 which makes the piston 26 move. The movement in the particular example of the illustration is toward the right of FIG. 1. That movement of hydraulic piston 26 is magnetically interacted with one or more magnet pistons 28 that are positioned adjacent the subject hydraulic piston 26. The magnetic interaction causes the magnet pistons 28 to move along with the subject hydraulic piston 26. Because the magnet pistons 28 are connected to the mobile component 30, in this case the flow tube, that flow tube will move toward the right of FIG. 1 as well. It will be appreciated that the SSV 12 is similarly controlled to that of the prior art in that a hydraulic fluid is used to begin an actuation process but is different in that the hydraulic fluid is never connected fluidically to the magnet pistons 28 meaning that a valve leak cannot be connected to the control line to the source. The tool 12 is thus inherently leakproof, requiring no seals to achieve that result. This is of particular interest in the hydrocarbon recovery industry to prevent leak paths beyond safety equipment.

The magnetic actuator 10 as noted above may be used with many different tools, some of which will be particularly useful in a downhole environment such as in a borehole 36 in a subsurface formation 38. The actuator 10 will generally be a part of a tubular string 40 disposed in the borehole 36.

While 24H has been described as a hydraulic piston chamber that will have a hydraulic fluid source attached thereto, it is also contemplated herein that the hydraulic piston chamber 24H may hold an electric prime mover as opposed to a hydraulic piston. The structure identified with numeral 26 is also intended to be viewed as a representation of other prime mover components such as a rotary motor, a linear motor, ball screw system, lead screw system, or any other practical prime mover for a valve such as the one described herein. Regardless of the prime mover type, be it hydraulic as described above or the electric or magnetic varieties just noted, the whole system still benefits from the fact that there is no extant fluid path between the downhole fluid to which the magnetic piston chamber 24M is exposed and the hydraulic or prime mover chamber 24H.

Set forth below are some embodiments of the foregoing disclosure:

Embodiment 1: A magnetic actuator including a housing having an inside surface, an outside surface and a body between the inside and outside surfaces; a mobile component movable relative to the housing; a magnet piston chamber disposed within the body; a magnet piston disposed in the magnet piston chamber and disposed to effect movement of the mobile component relative to the housing, the magnet piston having a magnetic field; a prime piston chamber disposed within the body in spaced relationship to the magnet piston chamber and segregated from the magnet piston chamber by material of the body, there being no fluid path between the magnet piston chamber and the prime piston chamber; a prime piston disposed in the prime piston chamber, the prime piston having a magnetic field; wherein the magnet piston is responsive to movement of the prime piston by magnetic interaction between the magnet piston and the prime piston.

Embodiment 2: The magnetic actuator as in any prior embodiment wherein the housing is a tubular member.

Embodiment 3: The magnetic actuator as in any prior embodiment wherein the mobile component is a flow tube of a safety valve.

Embodiment 4: The magnetic actuator as in any prior embodiment wherein the magnet piston chamber is a bore.

Embodiment 5: The magnetic actuator as in any prior embodiment wherein the prime piston chamber is a bore.

Embodiment 6: The magnetic actuator as in any prior embodiment wherein the magnet piston includes a plurality of magnets spaced apart from one another along a longitudinal axis of the magnet piston.

Embodiment 7: The magnetic actuator as in any prior embodiment wherein the prime piston includes a plurality of magnets spaced apart from one another along a longitudinal axis of the prime piston.

Embodiment 8: The magnetic actuator as in any prior embodiment wherein the both the magnet piston and prime piston include a plurality of magnets spaced apart from one another along a longitudinal axis of the respective magnet piston and prime piston and wherein the plurality of magnets on each of the magnet piston and prime piston are staggered relative to each other.

Embodiment 9: The magnetic actuator as in any prior embodiment wherein the magnetic interaction is magnetic coupling.

Embodiment 10: The magnetic actuator as in any prior embodiment wherein the magnetic interaction is magnetic repulsion.

Embodiment 11: The magnetic actuator as in any prior embodiment wherein the prime piston chamber is connected to a hydraulic fluid source.

Embodiment 12: The magnetic actuator as in any prior embodiment wherein the prime piston chamber houses an electric or magnetic prime mover.

Embodiment 13: The magnetic actuator as in any prior embodiment wherein the source is a control line.

Embodiment 14: The magnetic actuator as in any prior embodiment wherein the prime piston chamber, prime piston, magnet piston chamber and magnet piston constitute an actuation subsystem and wherein the magnetic actuator includes a plurality of actuation subsystems.

Embodiment 15: The magnetic actuator as in any prior embodiment wherein the magnet piston chamber is a plurality of magnetic piston chambers for each prime piston chamber.

Embodiment 16: A downhole system including a tubular string disposed in a borehole in a subsurface formation; a subsurface safety valve (SSV) disposed in the string, the SSV having a magnetic actuator as in any prior embodiment.

Embodiment 17: A method for actuating a tool using the magnetic actuator as in any prior embodiment including applying fluid pressure to the prime piston chamber; magnetically interacting the prime piston with the magnet piston; moving the component with the magnet piston.

Embodiment 18: The method as in any prior embodiment wherein the interacting is coupling.

Embodiment 19: The method as in any prior embodiment wherein the interacting is repelling.

Embodiment 20: The method as in any prior embodiment wherein the moving the component is moving a flow tube of a subsurface safety valve to open a flapper of the subsurface safety valve.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semisolids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A magnetic actuator comprising:
   a housing having an inside surface, an outside surface and a body between the inside and outside surfaces;
   a mobile component radially inwardly of the inside surface of and movable relative to the housing;
   a magnet piston chamber disposed within the body;
   a magnet piston disposed in the magnet piston chamber and in physical contact with the mobile component, the magnet piston having a magnetic field;
   a prime piston chamber disposed within the body in spaced relationship to the magnet piston chamber and segregated from the magnet piston chamber by material of the body, there being no fluid path between the magnet piston chamber and the prime piston chamber;
   a prime piston disposed in the prime piston chamber, the prime piston having a magnetic field coupled to the magnet piston but not to the mobile component.

2. The magnetic actuator as claimed in claim 1 wherein the housing is a tubular member.

3. The magnetic actuator as claimed in claim 1 wherein the mobile component is a flow tube of a safety valve.

4. The magnetic actuator as claimed in claim 1 wherein the magnet piston chamber is a bore.

5. The magnetic actuator as claimed in claim 1 wherein the prime piston chamber is a bore.

6. The magnetic actuator as claimed in claim 1 wherein the magnet piston includes a plurality of magnets spaced apart from one another along a longitudinal axis of the magnet piston.

7. The magnetic actuator as claimed in claim 1 wherein the prime piston includes a plurality of magnets spaced apart from one another along a longitudinal axis of the prime piston.

8. The magnetic actuator as claimed in claim 1 wherein the both the magnet piston and prime piston include a plurality of magnets spaced apart from one another along a longitudinal axis of the respective magnet piston and prime piston and wherein the plurality of magnets on each of the magnet piston and prime piston are staggered relative to each other.

9. The magnetic actuator as claimed in claim 1 wherein the magnetic interaction is magnetic coupling.

10. The magnetic actuator as claimed in claim 1 wherein the magnetic interaction is magnetic repulsion.

11. The magnetic actuator as claimed in claim 1 wherein the prime piston chamber is connected to a hydraulic fluid source.

12. The magnetic actuator as claimed in claim 11 wherein the source is a control line.

13. The magnetic actuator as claimed in claim 1 wherein the prime piston chamber houses an electric or magnetic prime mover.

14. A downhole system comprising:
    a tubular string disposed in a borehole in a subsurface formation;
    a subsurface safety valve (SSV) disposed in the string, the SSV having a magnetic actuator as claimed in claim 1.

15. A method for actuating a tool using the magnetic actuator as claimed in claim 1 comprising:
    applying fluid pressure to the prime piston chamber;
    magnetically interacting the prime piston with the magnet piston;
    moving the component with the magnet piston.

16. The method as claimed in claim 15 wherein the interacting is coupling.

17. The method as claimed in claim 15 wherein the interacting is repelling.

18. The method as claimed in claim 15 wherein the moving the component is moving a flow tube of a subsurface safety valve to open a flapper of the subsurface safety valve.

19. A magnetic actuator comprising:
    a housing having an inside surface, an outside surface and a body between the inside and outside surfaces;
    a mobile component movable relative to the housing;
    a magnet piston chamber disposed within the body;
    a magnet piston disposed in the magnet piston chamber and disposed to effect movement of the mobile component relative to the housing, the magnet piston having a magnetic field;
    a prime piston chamber disposed within the body in spaced relationship to the magnetic piston chamber and segregated from the magnet piston chamber by material of the body, there being no fluid path between the magnet piston chamber and the prime piston chamber;
    a prime piston disposed in the prime piston chamber, the prime piston having a magnetic field: wherein the magnet piston is responsive to movement of the prime piston by magnetic interaction between the magnet piston and the prime piston and wherein the prime piston chamber, prime piston, magnet piston chamber and magnet piston constitute an actuation subsystem and wherein the magnetic actuator includes a plurality of actuation subsystems.

20. A magnetic actuator comprising:
    a housing having an inside surface, an outside surface and a body between the inside and outside surfaces;

a mobile component movable relative to the housing;
a magnet piston chamber disposed within the body;
a magnet piston disposed in the magnet piston chamber and disposed to effect movement of the mobile component relative to the housing, the magnet piston having a magnetic field;
a prime piston chamber disposed within the body in spaced relationship to the magnet piston chamber and segregated from the magnet piston chamber by material of the body, there being no fluid path between the magnet piston chamber and the prime piston chamber;
a prime piston disposed in the prime piston chamber, the prime piston having a magnetic field;
wherein the magnet piston is responsive to movement of the prime piston by magnetic interaction between the magnet piston and the prime piston and wherein the magnet piston chamber is a plurality of magnetic piston chambers for each prime piston chamber.

\* \* \* \* \*